US007515749B2

(12) United States Patent
Masaki

(10) Patent No.: US 7,515,749 B2
(45) Date of Patent: Apr. 7, 2009

(54) IMAGE PROCESSING METHOD, RECORDING MEDIUM WITH RECORDED IMAGE PROCESSING PROGRAM AND IMAGE PROCESSING APPARATUS

(75) Inventor: Kenji Masaki, Nagaokakyo (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 11/727,560

(22) Filed: Mar. 27, 2007

(65) Prior Publication Data

US 2007/0172121 A1    Jul. 26, 2007

Related U.S. Application Data

(62) Division of application No. 09/291,358, filed on Apr. 14, 1999, now Pat. No. 7,215,812.

(30) Foreign Application Priority Data

Apr. 14, 1998 (JP) .................... 10-102756

(51) Int. Cl.
G06K 9/00 (2006.01)
(52) U.S. Cl. .................. 382/168; 358/448; 345/617
(58) Field of Classification Search ............. 382/100, 382/162, 163, 164, 165, 166, 167, 168, 169, 382/170, 171, 172; 358/448, 461; 345/418, 345/426, 617, 618
See application file for complete search history.

(56) References Cited

U.S. PATENT DOCUMENTS

| | | | |
|---|---|---|---|
| 4,364,084 A | 12/1982 | Akimoto | |
| 4,651,199 A * | 3/1987 | Alkofer | ............ 358/506 |
| 4,989,079 A | 1/1991 | Ito | |
| 5,109,275 A | 4/1992 | Naka | |
| 5,194,946 A | 3/1993 | Morkawa | |
| 5,202,935 A | 4/1993 | Kanamori | |
| 5,317,420 A | 5/1994 | Kuwahara | |
| 5,347,374 A | 9/1994 | Fuss | |
| 5,418,895 A * | 5/1995 | Lee | ............ 345/604 |
| 5,448,502 A | 9/1995 | Kindo | |
| 5,450,502 A * | 9/1995 | Eschbach et al. | ............ 382/169 |
| 5,461,440 A | 10/1995 | Toyoda | |
| 5,508,823 A | 4/1996 | Kiyohara | |
| 5,543,936 A | 8/1996 | Ulichney | |
| 5,576,811 A | 11/1996 | Kobayashi | |

(Continued)

FOREIGN PATENT DOCUMENTS

EP    0 357 385 A2    3/1990

(Continued)

OTHER PUBLICATIONS

Japanese Office Action dated Aug. 23, 2005, directed to corresponding foreign application.

*Primary Examiner*—Anand Bhatnagar
(74) *Attorney, Agent, or Firm*—Morrison & Foerster LLP

(57) ABSTRACT

An image processing method for carrying out predetermined correction processing with respect to one or more items regarding the quality of color images and the image processing method comprises a judgment step for judging the necessity/nonnecessity of correction with respect to each of the above-mentioned items and a correction processing step for carrying out the predetermined correction processing with respect to the item judged as required to be corrected at the above-mentioned judgment step.

3 Claims, 9 Drawing Sheets

U.S. PATENT DOCUMENTS

| | | |
|---|---|---|
| 5,579,131 A | 11/1996 | Kusumoto |
| 5,667,944 A | 9/1997 | Reem |
| 5,742,410 A | 4/1998 | Suzuki |
| 5,751,343 A | 5/1998 | Hibino |
| 5,946,006 A | 8/1999 | Tajika |
| 5,974,190 A | 10/1999 | Maeda |
| 6,014,469 A | 1/2000 | Eschbach |
| 6,055,340 A | 4/2000 | Nagao |
| 6,151,410 A * | 11/2000 | Kuwata et al. ............. 382/167 |
| 6,181,321 B1 * | 1/2001 | Zhao et al. ................. 345/617 |
| 6,201,893 B1 | 3/2001 | Shiraiwa |
| 6,256,112 B1 | 7/2001 | Kawano |
| 6,272,259 B1 | 8/2001 | Mizoguchi |
| 6,388,768 B2 | 5/2002 | Hada |
| 6,393,148 B1 * | 5/2002 | Bhaskar ...................... 382/169 |

FOREIGN PATENT DOCUMENTS

| | | |
|---|---|---|
| JP | 2105677 | 4/1990 |
| JP | 5101181 | 4/1993 |
| JP | 5191661 | 7/1993 |
| JP | 6-68253 | 3/1994 |
| JP | 9172553 | 6/1997 |
| JP | 9-322005 | 12/1997 |
| JP | 09322002 | 12/1997 |
| JP | 10095135 | 4/1998 |

* cited by examiner

IMAGE PROCESSING METHOD, RECORDING MEDIUM WITH RECORDED IMAGE PROCESSING PROGRAM AND IMAGE PROCESSING APPARATUS

REFERENCE TO RELATED APPLICATIONS

This application is a division of Ser. No. 09/291,358, filed Apr. 14, 1999, now U.S. Pat. No. 7,215,812, which claims priority from Japanese patent application No. Hei 10-102756, filed Apr. 14, 1998, the contents of which are hereby incorporated by reference.

FIELD OF THE INVENTION

The present invention relates to execution of predetermined correction regarding the image quality of color images captured by a digital camera, a scanner and the like. More particularly, the present invention relates to an image correction method to be carried out at the time of processing, editing and the like of color images, to a readable recording medium with a recorded processing program using the image correction method, and to an image processing apparatus to which the image correction method is applied.

DESCRIPTION OF THE RELATED ART

In conventional computer processing, color images have been processed and edited by using predetermined program software. A program for correcting the image quality of color images has been known as a program for supporting this editing operation, and has been built in a special-purpose image processing apparatus or provided on the market in the form of ROM, for example.

Unlike the image correction of manuscript images captured by a color copier or the like, the image correction of color images in the processing and editing operations using a computer is required to reflect the intention of the editor. Therefore, in the processing procedure in accordance with a conventional image correction program, the necessity/nonnecessity of correction processing is judged by the editor. When image correction is instructed by the editor, the image correction program is executed, and predetermined correction processing is carried out.

FIG. 12 is a flowchart showing a conventional processing procedure for correcting plural color images all together.

In accordance with this flowchart, the editor displays plural images photographed by a digital camera for example on a display device, such as a CRT, and determines images required to be corrected. The editor inputs a command for instructing image correction to run an image correction program. In accordance with this image correction program, when plural files to be subjected to image correction and the output destinations of the files after correction are input by the editor interactively or in a form required for information input (#101 and #102), first, a processing file count value n is set at "1" (#103). Next, the image data of the file designated first is read (#104). After predetermined image correction processing (contour correction, contrast correction and the like, for example) is carried out (#105), the file including the image data is output to the designated output destination (a memory for storing the data, a printer and the like) (#106).

Next, the count value n is incremented by one (#107), and whether the count value n is larger than the designated number N of files is judged (#108). If the count value n is not larger than the number N (NO at #108), the procedure returns to #104, and the same predetermined image processing is carried out for the next image file (#104 to #108). If the count value n is larger than the designated total number N of files (YES at #108), it is judged that the image correction processing has been completed for the files, and the processing ends.

In the conventional image correction program, the editor judges the necessity/nonnecessity of image correction, and on the basis of the result of the judgment, the predetermined image correction processing is carried out for a color image required to be corrected. Therefore, in the case when plural photographed color images are corrected for example, the editor must judge the necessity/nonnecessity of image correction for each color image. This becomes burdensome to the editor. In addition, since the designated plural color images are corrected all together, in the case when images not required to be corrected are included, image quality will be deteriorated by the correction, and image correction must be carried out again. This may lower processing efficiency.

SUMMARY OF THE INVENTION

In order to solve the above-mentioned problems, the present invention is intended to provide an image processing method capable of carrying out image correction efficiently, a readable recording medium with a recorded program for the processing method and an image processing apparatus to which the processing method is applied.

The present invention relates to an image processing method for carrying out predetermined correction processing with respect to one or more items regarding the quality of color images. The image processing method judging the necessity of correction with respect to each of the above-mentioned items and a correction processing for carrying out the predetermined correction processing with respect to the item judged as required to be corrected during judgment.

With the above-mentioned configuration, in the case when the predetermined image correction processing is carried out with respect to one or more items regarding the image quality of color images, unlike the case when correction is carried out in comparison with predetermined values having been determined simply, the necessity/nonnecessity of correction is judged comprehensively with respect to each item on the basis of the whole condition of each image. Correction processing is then carried out with respect to items required to be corrected.

In addition, the present invention includes, as correction judgment items, at least one of a sunset judgment used to judge whether a color image is a sunset scene or not, a color covering judgment used to judge whether the whole of a color image is covered with a specific color or not, a contrast judgment used to judge whether a color image has a normal contrast or not, and a sharpness judgment used to judge whether a color image has a normal sharpness or not.

With the above-mentioned configuration, at least one of the sunset judgment, color covering judgment, contrast judgment and sharpness judgment is carried out. When it is judged that correction is necessary, the predetermined correction processing with respect to the judgment item is carried out for a color image.

Furthermore, the present invention relates to a readable recording medium with a recorded program for carrying out the predetermined correction processing with respect to one or more items regarding the image quality of color images. The processing program comprising judging the necessity of correction with respect to each item described above and correction processing for carrying out the predetermined correction processing with respect to the item judged as required to be corrected at the above-mentioned judgment is stored in the readable recording medium.

Moreover, the present invention relates to an image processing apparatus for carrying out the predetermined correction processing with respect to one or more items regarding the image quality of color images. The image processing apparatus comprises a judgment device to judge the necessity of correction with respect to each item described above and a correction device to carry out the predetermined correction processing with respect to the item judged as required to be corrected during judgment.

Additionally, the image processing apparatus of the present invention comprises an image designation device to designate plural color images to be corrected, and a correction processing control device to judge the necessity of correction for the color images designated by the image designation device and for carrying out the predetermined correction processing on the basis of the result of the judgment.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Embodiments in accordance with the present invention shown in the accompanying drawings will be described below in detail.

Figure 1:
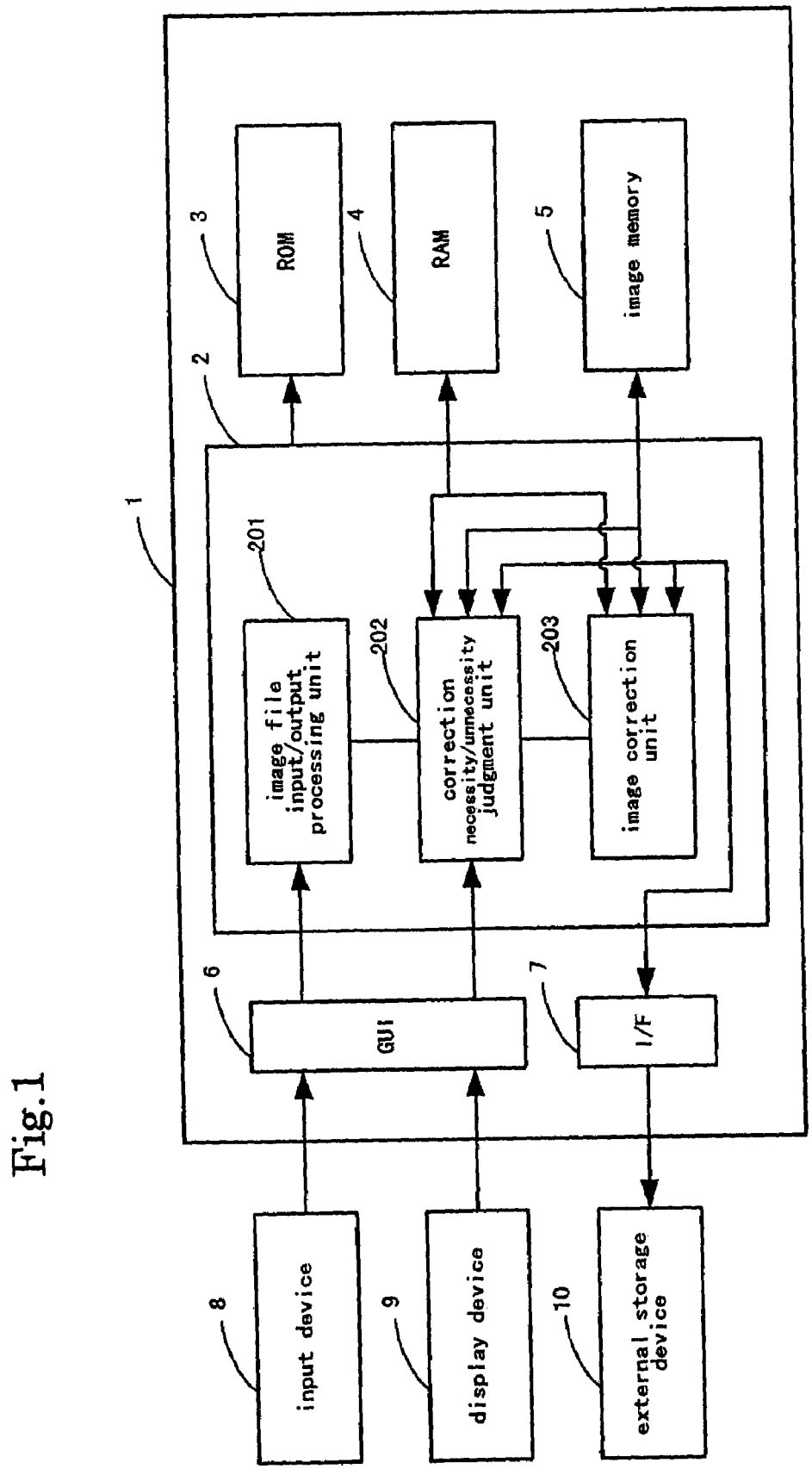
FIG. 1 is a block diagram showing an embodiment of an image processing apparatus in accordance with the present invention.

FIG. 1 is a block diagram showing an embodiment of an image processing apparatus in accordance with the present invention.

The image processing apparatus shown in FIG. 1 comprises a control unit 2, a ROM (Read Only Memory) 3, a RAM (Random Access Memory) 4, an image memory 5, a GUI (Graphical User Interface) 6, an I/F 7, an input device 8, a display device 9 and an external storage device 10. The control unit 2, the ROM 3, the RAM 4, the image memory 5, the GUI 6 and the I/F 7 are built in an apparatus body 1. The input device 8 and the display device 9 are connected to the control unit 2 via the GUI 6, and the external storage device 10 is connected to the control unit 2 via the I/F 7.

The control unit 2 is provided with an image file input/output processing unit 201, a correction necessity/nonnecessity judgment unit 202 and an image correction unit 203 for carrying out image processing.

The image file input/output processing unit 201 is used to read color images (electric images) of an image file having been input from the input device 8 from a recording medium (the RAM 4, the external storage device 10, an internal storage device if provided, or the like, for example), and to output corrected image data to a predetermined output destination (a recording medium, a printer, other peripheral devices or the like) having been input from the input device 8.

The correction necessity/nonnecessity judgment unit 202 is used to judge whether preset image correction is required or not for color images read from a recording medium. The correction necessity/nonnecessity judgment unit 202 has at least a sunset judgment, a color covering judgment, a contrast judgment and a sharpness judgment as judgment items. The sunset judgment is used to judge whether a color image is a sunset scene or not, and the color covering judgment is used to judge whether the whole of a color image is covered with a specific color (a greenish color when a photograph is taken by using a fluorescent lamp as a light source, for example) or not. In addition, the contrast judgment is used to judge whether a color image has a normal contrast or not, and the sharpness judgment is used to judge whether a color image has a normal sharpness or not.

The image correction unit 203 is used to carry out image correction for items corresponding to a color image judged as "correction necessary" on the basis of the judgment result of the correction necessity/nonnecessity judgment unit 202. If an image different from a sunset scene is judged that the image is covered with red for example, the red component on the whole of the color image is weakened to correct the color covering.

The ROM 3 is a memory wherein the program for the above-mentioned image correction processing has been stored. The RAM 4 is used to temporarily store various data calculated by the image correction processing. Furthermore, the image memory 5 is used to store color image data read from a recording medium to carry out image correction judgment and image correction. The image memory 5 has an image data storage capacity for at least three images. Image data constituting color images is separated into the color components R, G and B, and stored.

The display device 9 is used to display various matters, such as an operation menu, processing conditions and processing results (including monitor display of corrected color images), and is formed of an electronic display, such as a CRT (Cathode Ray Tube) or an LCD (Liquid Crystal Display). Image correction items are represented by icons on the operation menu of the display device 9, whereby the operator can carry out image correction processing as described below by selecting the icons.

The external storage device 10 functions as a storage device for image data to be corrected or a storage device for corrected image data, and reads and writes image data on external recording media such as floppy disks, optical disks, magnetic disks and magneto-optic disks.

Figure 4:
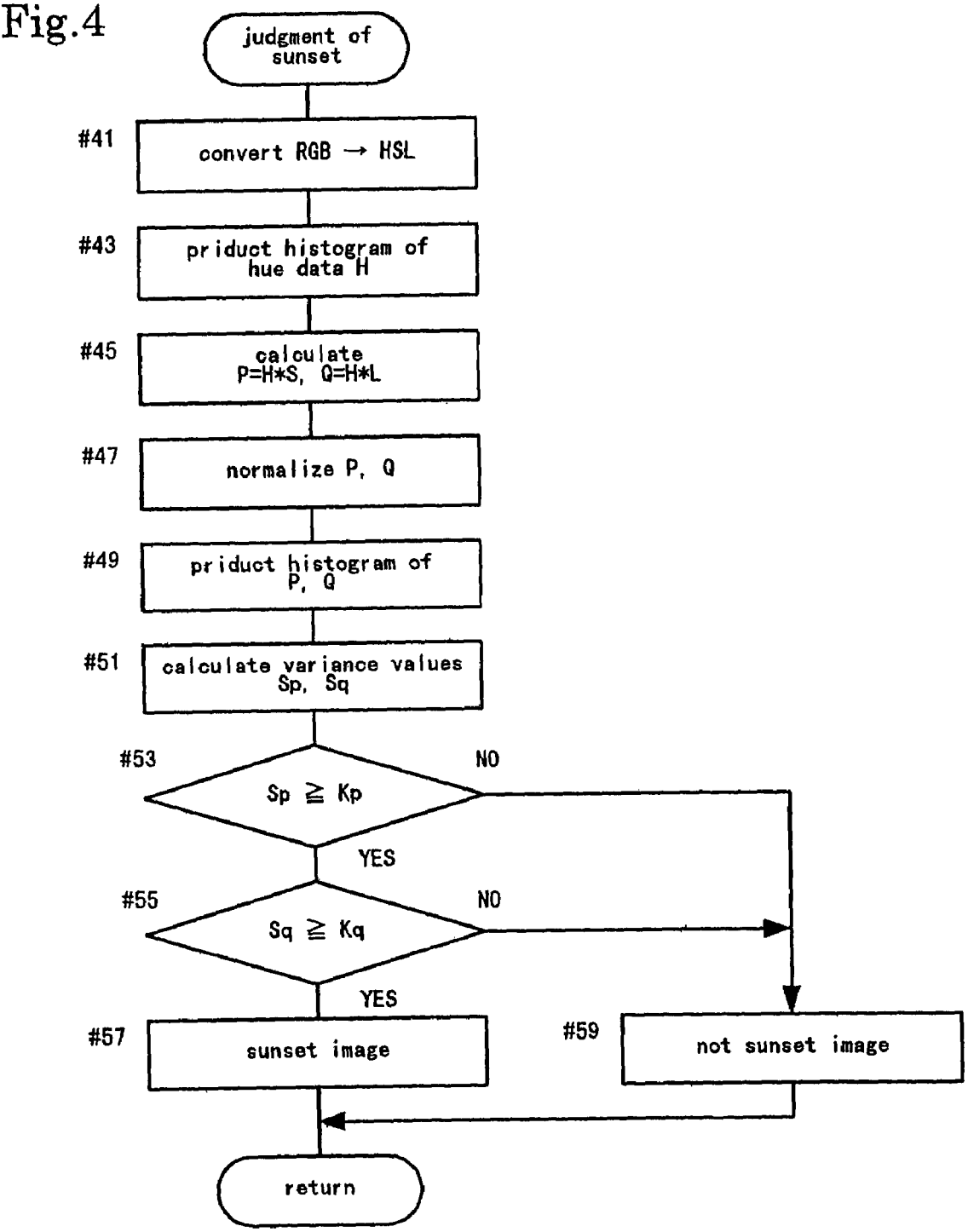
FIG. 4 is a flowchart showing the processing procedure of a sunset judgment.
Figure 5:
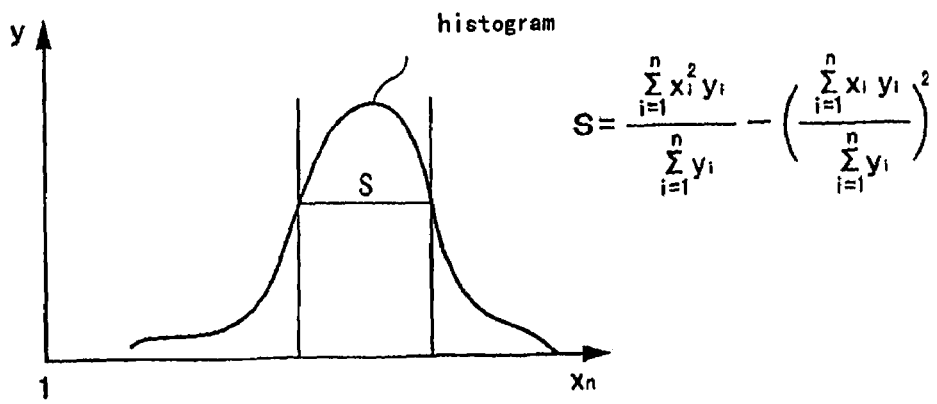
FIG. 5 is a graph showing a method of calculating a variance value for a histogram.
Figure 6:
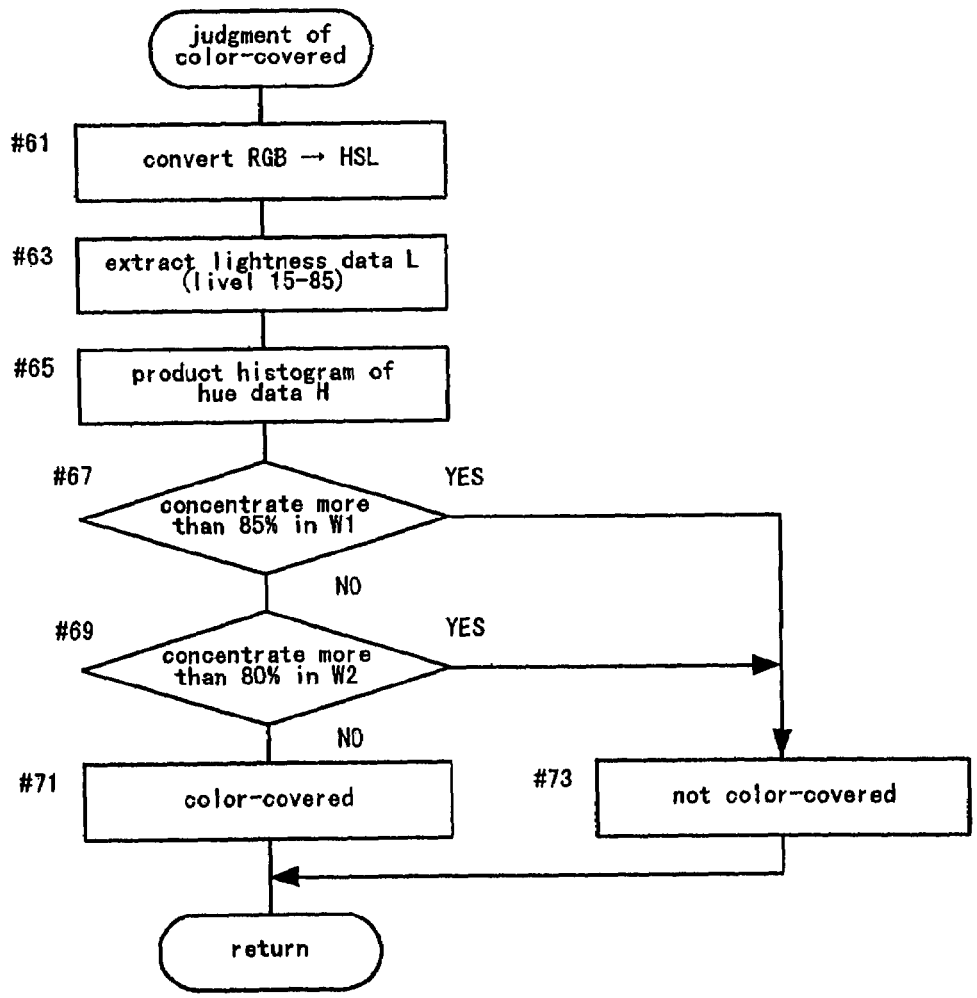
FIG. 6 is a flowchart showing the processing procedure of a color covering judgment.

Next, the image correction processing of the image processing apparatus will be described below referring to the flowcharts of FIGS. 2 to 5 and the histogram of image data of FIG. 6.

Figure 2:
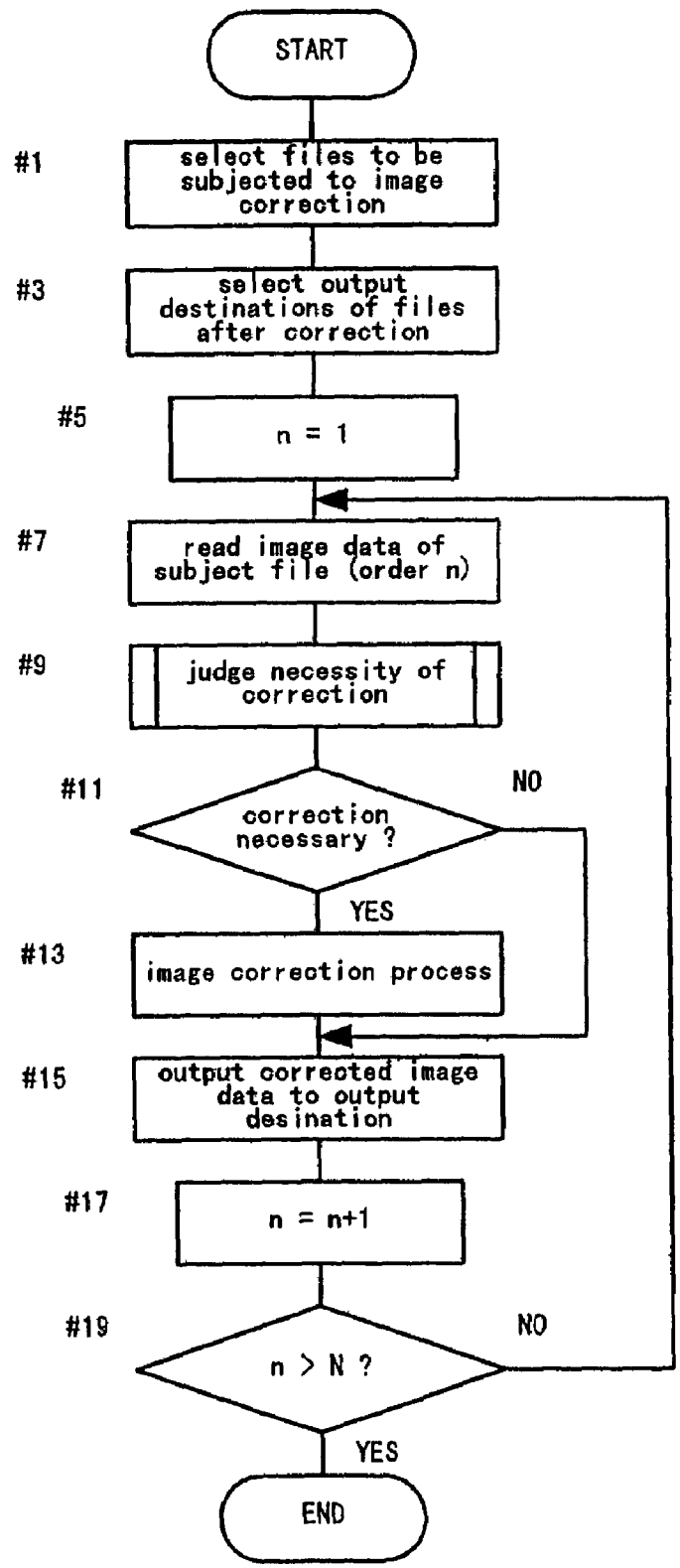
FIG. 2 is a main flowchart showing the processing procedure of image correction processing.

FIG. 2 is a flowchart showing the basic processing procedure of image correction processing. When image correction is instructed by the operator via the input device 8 in accordance with an operation menu shown on the display device 9, a processing program shown in FIG. 2 is read from the ROM 3, and image correction processing is carried out in accordance with the processing program.

When plural image files for image correction and an output destination after image correction of each image file are input by the operator (#1 and #3), a processing file count value n is first set at "1" (#5). Next, the image data of the first image file is read from a designated recording medium to the image memory 5 (#7). The image data is subjected to the judgment of the necessity/nonnecessity of preset image correction items in accordance with the correction necessity/nonnecessity judgment processing procedure shown in FIG. 2 (#9).

When image correction is judged as necessary on the basis of the image correction necessity/nonnecessity judgment (YES at #11), predetermined image correction processing is carried out for items judged as "correction necessary," and the corrected image data is then output to a designated output destination (the external storage device 10, a printer (not shown) or the like, for example) (#13 and #15). Furthermore, when image correction is judged as unnecessary (NO at #11), image data is output as it is to the designated output destination without image correction processing (#15).

Next, the count value n is incremented by only "1" (#17), and whether the count value n is larger than the total number N of the designated image files or not is judged (#19). If the count value n is not larger (NO at #19), the procedure returns to step #7, and the image correction necessity/nonnecessity judgment, the image correction processing and the output processing of image data are carried out for the next image file name in the same way (#7 to #15). If the count value n is larger than the total number N of the files (YES at #19), it is judged that image correction processing for all the image files has been completed, and the processing ends.

Figure 3:
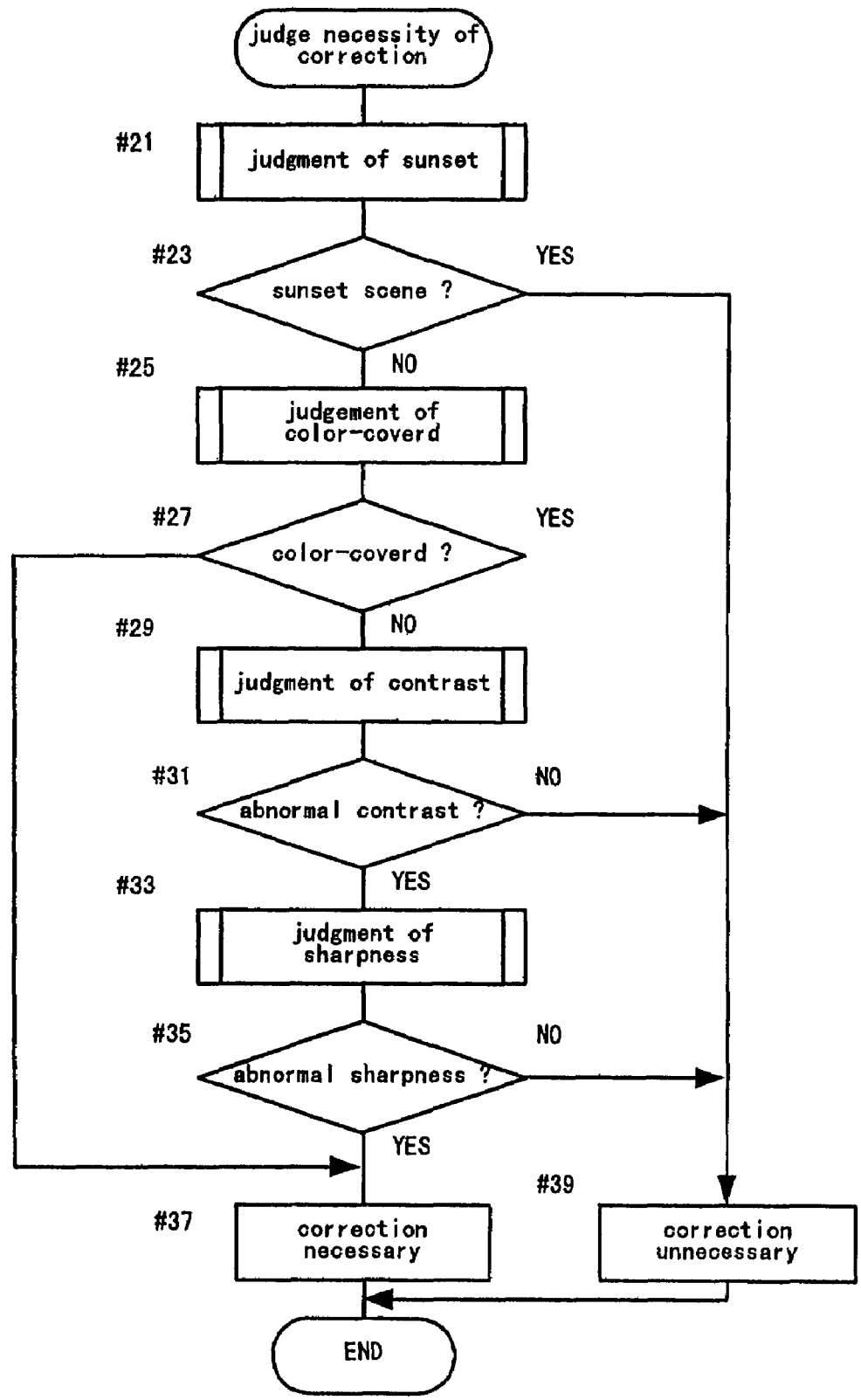
FIG. 3 is a flowchart showing the processing procedure of the necessity/nonnecessity of image correction.

Next, the image correction necessity/nonnecessity judgment will be described in accordance with the flowchart shown in FIG. 3.

In the image correction necessity/nonnecessity judgment, by using the image data stored in the image memory 5, a judgment as to whether the color image thereof is an image of a sunset scene or not (#21 and #23), a judgment as to whether the color image is color-covered or not (#25 and #27), a judgment as to whether the color image is normal in contrast or not (#29 and #31), and a judgment as to whether the color image is normal in sharpness or not (#33 and #35) are carried out in this order. This order of judgment items is determined to raise judgment efficiency and judgment accuracy.

In other words, the judgment as to whether the color image is a sunset scene or not (hereinafter referred to as a sunset judgment) is carried out on the basis of the histogram distribution of image data of part of color components in the range of red to yellow as described below. The judgment as to whether the color image is color-covered or not (hereinafter referred to as a color covering judgment) is carried out on the basis of the histogram distribution of image data of the whole of color components in the range of red to blue as described below. Since the processing load for the color covering judgment is higher than that for the sunset judgment, the sunset judgment is carried out earlier than the color covering judgment to attain efficient judgment.

Furthermore, the judgment as to whether the color image is normal in contrast or not (hereinafter referred to as a contrast judgment) is carried out after the sunset judgment and the color covering judgment in view of judgment efficiency, since the contrast judgment can use the histograms of the image data created at the time of the sunset judgment and the color covering judgment. A photographed image has sharp edges just as a photographed scene taken in cloudy weather although its contrast is low. In order to be able to judge the contents of such a photographed scene, the judgment as to whether the color image is normal in sharpness or not (hereinafter referred to as a sharpness judgment) is carried out after the contrast judgment in consideration of judgment accuracy.

At the time of the sunset judgment, an index value for the sunset judgment is calculated by using the histogram of hue data (#21) as described below, and this index value is compared with a predetermined threshold value to judge whether the color image is a sunset scene or not (#23). If the color image is a sunset scene (YES at #23), a judgment result of "correction unnecessary" is output (#39). The procedure returns, and if the color image is not a sunset scene (NO at #23), the color image is further subjected to the color covering judgment.

At the time of the color covering judgment, an index value for the color covering judgment is calculated by using the histogram of the hue data (#25) as described below, and this index value is compared with a predetermined threshold value to judge whether the color image has undergone the covering of a specific color or not (#27). If the color image is not a sunset scene and is color-covered (YES at #27), a judgment result requiring correction for color covering is output (#37). The procedure returns, and if the color image is not a sunset scene and is not color-covered (NO at #27), the contrast judgment is further carried out (#25).

At the time of the contrast judgment, an index value for the contrast judgment is calculated by using the histograms of the color components R, G and B (#29) as described below, and this index value is compared with a predetermined threshold value to judge whether the contrast of the color image is normal or not (#31). If the color image is not a sunset scene, is not color-covered and is normal in contrast (NO at #31), the color image is judged that it is not a sunset scene and is normal in image quality, and a judgment result of "correction unnecessary" is output (#39). The procedure returns, and if the color image is not a sunset scene and is not color-covered but is abnormal in contrast (YES at #31), the sharpness judgment is further carried out (#35).

At the time of the sharpness judgment, data in the edge region in the color image is extracted, an index value for the sharpness judgment is calculated by using this data (#33), and this index value is compared with a preset threshold value to judge whether the sharpness of the color image is normal or not (#35).

If the color image is not a sunset scene, is not color-covered and is normal in both contrast and sharpness (NO at #35), the color image is judged that it is not a sunset scene and is normal in image quality, and a judgment result of "correction unnecessary" is output (#39). The procedure returns, and if the color image is not a sunset scene and is not color-covered but is abnormal in contrast and sharpness (YES at #35), a judgment result requiring correction for intensifying image edges is output (#37). The procedure then returns.

Next, the sunset judgment procedure will be described referring to the flowchart of FIG. 4. The flowchart of FIG. 4 corresponds to concrete processing procedures conducted at step #21 of FIG. 3.

In the case of the photographed image of a scene wherein a white wall is irradiated with evening sunlight for example, the white wall is orange-colored, and the shade of the color changes spontaneously in the range of red to yellow. Therefore, the sunset judgment is carried out by judging the distribution condition of the color components in the range of red to yellow in the image. More concretely, the sunset judgment is carried out as described below. Regarding the image data (pixel data) belonging in the range from red to yellow, the product P (=H·S) of the hue data H and the saturation data S thereof, and the product Q (=H·L) of the hue data H and the lightness data L are calculated, P and Q are represented by histograms, and the degrees of their dispersion are examined.

In other words, the image data (pixel data) of the color components R, G and B stored in the image memory 5 is first converted into the three attributes of color, i.e., H, L and S, in accordance with the conversion equation shown at the following steps 0 to 3 (#41).

Step 0 (preparation)
① M=max(R,G,B); m=min(R,G,B)
② When M=m, the color is a neutral color, and step 0 advanced to step 1.
③ r=(M−R)/(M−m); g=(M−G)/(M−m); b=(M−B)/(M−m)
Note that at least one of r, g and b is 0, and that at least one of them is 1.

Step 1 (calculation of lightness L)
L=(M+m)/2

Step 2 (calculation of saturation S)
When M=m (neutral color), S=0.0
When M≠m and L≦0.5, S=(M−m)/(M+m)
When M≠m and L>0.5, S=(M−m)/(2−M−m)

Step 3 (calculation of hue H)
When S=0.0 (neutral color), H'=0.0
When S≠0 and R=M, H'=2+b−g
When S≠0 and G=M, H'=4+r−b
When S≠0 and B=M, H'=6+g−r
H=60H' (mod 360: the hue of the neutral color is assumed 0)

Next, after the level of the hue data H is converted so that the maximum value 360 becomes "255", the histogram of the hue data H is created at a class pitch of "1" for example (#43). The hue data H is normalized herein by "255" because of the following reasons. Since data processing is carried out by using 8-bit data, the processing can be made easy by this normalization. Furthermore, the judgment accuracy is not much affected by this normalization.

Next, the hue data H included in the range of class 64 to class 125 (in the range of red to yellow) is extracted. The product P (=H·S) of each of the hue data H and the saturation data S corresponding thereto and the product Q (=H·L) of each of the hue data H and the lightness data L corresponding thereto are calculated (#45).

Next, after the levels of the calculated values P and Q are converted so that the maximum value becomes "255" (#47), the histograms of the calculated values P and Q are created at a class pitch of "1" for example (#49), and the variance values Sp and Sq of each histogram are calculated (#51). The variance value S can be calculated by using the following equation (1) for a histogram with frequency y corresponding to class x as shown in FIG. 5.

$$S = \frac{\sum_{i=1}^{n} x_i^2 y_i}{\sum_{i=1}^{n} y_i} - \left( \frac{\sum_{i=1}^{n} x_i y_i}{\sum_{i=1}^{n} y_i} \right)^2 \qquad (1)$$

The variance values Sp and Sq are compared with predetermined threshold values Kp and Kq (Kp=850, Kq=1200) corresponding thereto, respectively (#53 and #55). If Sp≧Kp and Sq≧Kq (YES at #53 and #55), it is assumed that the gradation at the portions in the range of red to yellow in a color image is wide, and that the red portion is colored by evening sunlight, whereby the color image is judged as a sunset image (#57). If Sp<Kp or Sq<Kq (NO at #53 or NO at #55), it is assumed that the gradation at the portions in the range of red to yellow in the color image is narrow, and that the red portion is not colored by evening sunlight, whereby the color image is not judged as a sunset image (#59).

Next, the color covering judgment procedure will be described below referring to the flowchart of FIG. 6. The flowchart of FIG. 6 corresponds to the concrete processing procedures for the step #25 of FIG. 3.

Color covering is a condition wherein the whole of a color image is covered with a specific color and the color balance of the color image is lost such that a photograph taken without flashlight under a fluorescent lamp for example becomes greenish on the whole. Therefore, the color covering judgment is carried out by judging the distribution condition of all the color components in the image. However, since the contents of the image may sometimes have one specific color, the color covering judgment is carried out in this case in consideration of not misjudging that the image is color-covered.

First, the image data (pixel data) of the color components R, G and B stored in the image memory 5 is converted into the image data of the three color attributes H, L and S by the conversion equation shown as the above-mentioned equation 1 (#61). Next, image data having the lightness data L in the range of about "15" to "85" is extracted (#63). Since the shade of the color cannot be judged accurately at the dark portions and bright portions in the image, this extraction is carried out so that the image data in these portions is not judged.

Next, a histogram is created for the hue data H corresponding to the extracted lightness data L at a class pitch of "1" for example (#65). A judgment is carried out as to whether a predetermined quantity or more (85% or more for example) of the whole image data (pixel data) is intensively distributed in a predetermined range W1 (the range of class 20 for example) of a specific color region (#67). Since the presence or absence of color covering is checked in the whole color region in the case of the color covering judgment, the processing of normalizing the hue data H by "255" is not carried out in consideration of judgment accuracy.

Figure 7:
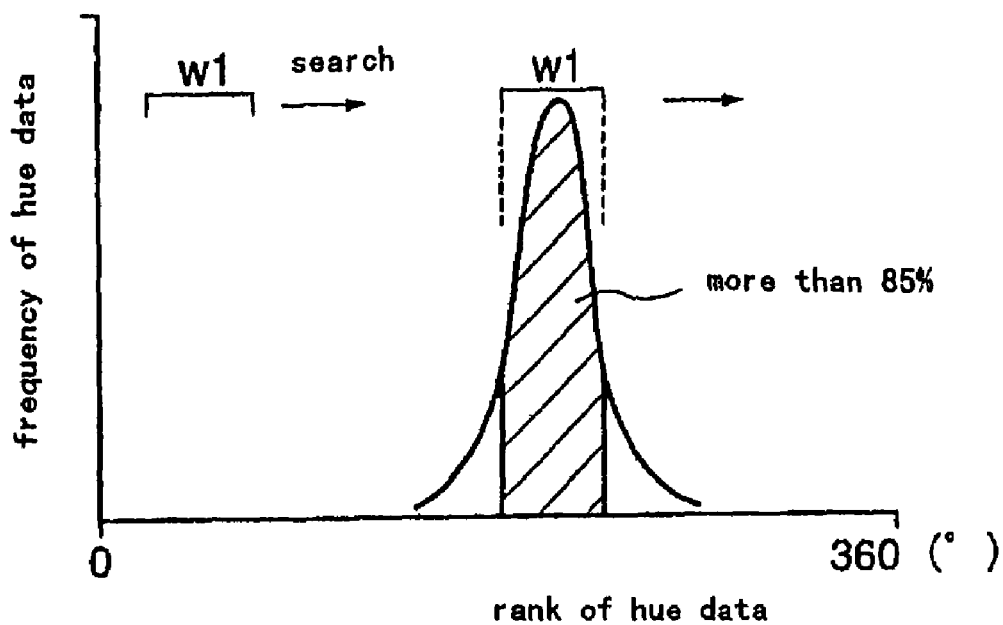
FIG. 7 is a graph showing an example of the shape of a histogram for hue data not judged as color covering in the color covering judgment.

If image data is intensively distributed in a specific color region as shown in FIG. 7 (if 85% or more of image data (pixel data) is distributed in the predetermined range W1 of a specific color region) (YES at #67), the color image is not judged as color-covered but judged as a color image having image data intensively distributed (#73). If the image data is not intensively distributed (NO at #67), a judgment is further carried out as to whether a predetermined quantity or more (80% or more for example) of the whole image data (pixel data) is distributed in a predetermined range W2 (>W1, the range of class 50 for example) of a specific color region (#69).

Figure 8:
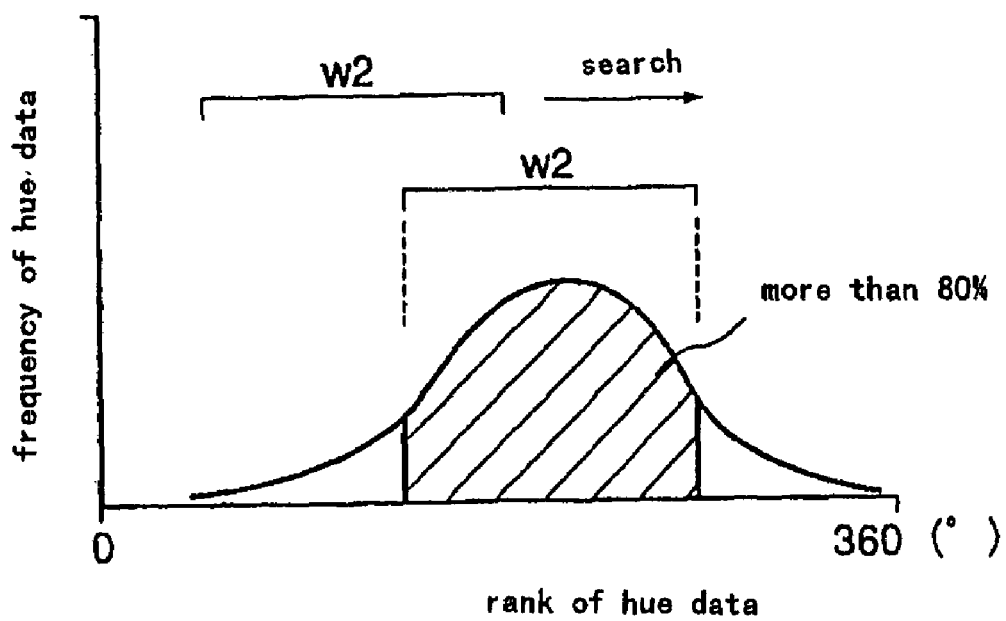
FIG. 8 is a graph showing an example of the shape of a histogram for hue data judged as color covering in the color covering judgment.

If 80% or more of image data (pixel data) is intensively distributed in the predetermined range W2 of a specific color region as shown in FIG. 8 (YES at #69), the color image is judged as color-covered by the color (#71). If 80% or more of image data is not distributed intensively (NO at #69), the color image (pixel data) is judged as not color-covered (#73).

Next, the contrast judgment procedure will be described below referring to the flowchart of FIG. 9. The flowchart of FIG. 9 corresponds to the concrete processing procedures for the step #29 of FIG. 3.

Figure 10:
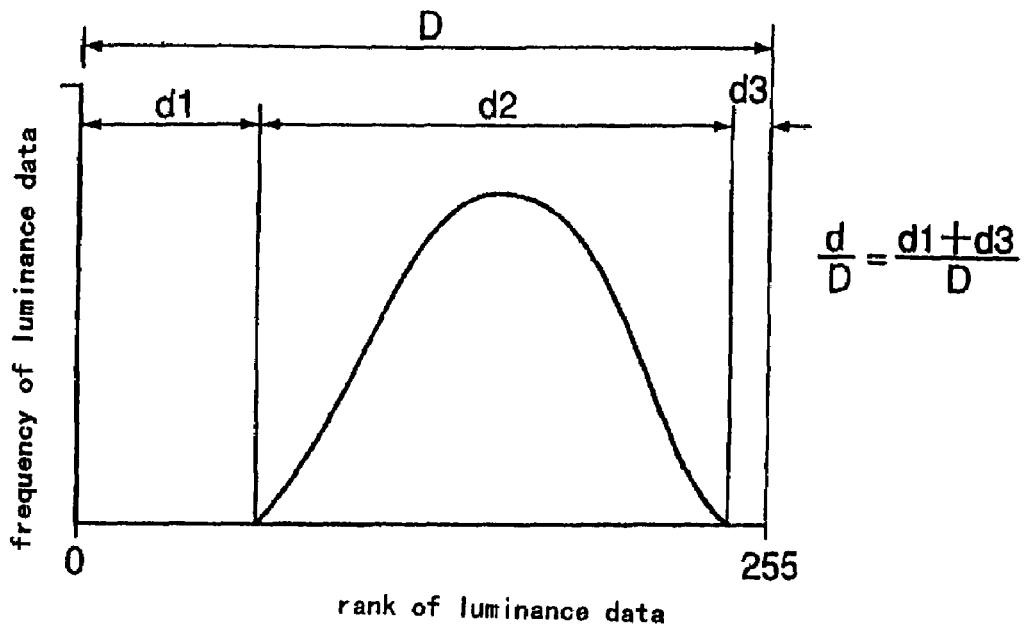
FIG. 10 is a graph illustrating a method of calculating an index value for the contrast judgment by using a histogram for image data.

The contrast judgment is carried out by judging whether the image data of each of the color components R, G and B effectively has used a dynamic range or not. In other words, in the case when the histogram of the image data is created as shown in FIG. 10, the contrast judgment is carried out by judging whether the ratio of the range d (d=d1+d3 in FIG. 10 for example) of the frequency "0" class in the whole class range D is larger than a predetermined threshold value K or not.

First, a histogram at the level of the class pitch "1" for example is created for each of color components R, G and B (#81). Next, the ranges dr, dg and db of the frequency "0" class are calculated for the color components, respectively (#83), and the ratio dj/D (%) (j=r, g, b) of the class range dr, dg, db to the whole class range D (=255) is calculated (#85). And dj/D is compared with a predetermined threshold value Kj (j=r, g, b) (10% for example), respectively (#87, #89 and #91). If Dj/D≦Kj in all the color components of the image (YES at all the steps of #87 to #91), the contrast is judged as normal (#93). If Dj/D>Kj (NO at #87, #89 or #91), the contrast is judged as abnormal (#95).

Figure 9:
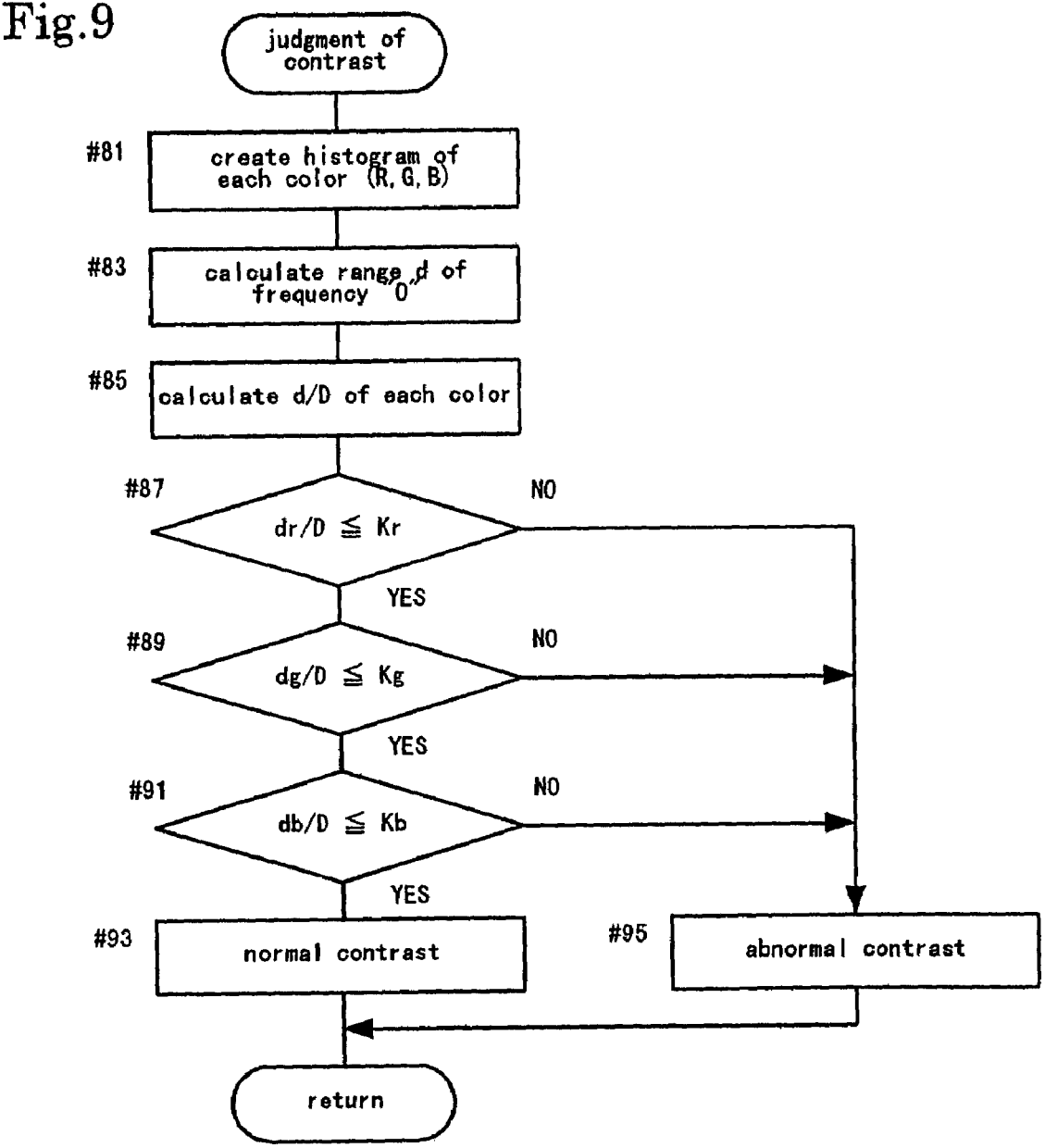
FIG. 9 is a flowchart showing the processing procedure of a contrast judgment.

Although the image data of the color components R, G and B is used for the contrast judgment shown in FIG. 9, the contrast judgment may be carried out by using data converted into H, S and L. In the case when the contrast judgment is carried out by using the HSL data, a histogram should be created for the L (lightness) data among the HSL data, and the same judgment as described above should be carried out.

Next, the sharpness judgment will be described.

The sharpness judgment is carried out by calculating sharpness by using the method disclosed in the U.S. Pat. No. 2,611,723 for example, and by comparing this sharpness with a predetermined threshold value. The details of the method of calculating the sharpness are omitted. The sharpness disclosed in the patent publication is obtained by extracting the image data (pixel data) of the edge portions of an image by using a linear differentiation filter, a quadratic differentiation filter, a high frequency filter or a band-pass filter, by calculating a high frequency component at a pixel position extracted by applying a high frequency filter to this image data, and by normalizing the intensity of the high frequency component of the whole edge region obtained by integrating the intensity of the high frequency component with respect to the area of the edge region.

If the sharpness is higher than the predetermined threshold value, the sharpness is judged as normal. If the sharpness is not higher than the predetermined threshold value, the sharpness is judged as abnormal.

As described above, in the color image correction processing, the necessity/nonnecessity of correction is judged with respect to the correction items regarding the preset image quality, and image correction is carried out only for the items required to be corrected. Therefore, correction is not carried out for the color images which are not required to be corrected, whereby processing efficiency can be enhanced. Furthermore, it is possible to prevent image deterioration due to image correction carried out for color images which are not required to be corrected.

In the above-mentioned embodiment, the sunset judgment, the color covering judgment, the contrast judgment and the sharpness judgment are taken as examples of the judgment items for the necessity/nonnecessity of correction in image quality. However, if the saturation of a color image is excessive for example, a judgment as to whether correction for relieving the excessive saturation is required or not may be included. The judgment as to whether the saturation is normal or not is carried out by converting the image data of the three primary colors R, G and B into the image data of the three attributes H, S and L for example, by selecting a predetermined hue, and by comparing the saturation data S corresponding to the hue with a predetermined threshold value Ks (50% of the maximum saturation of the hue for example). If the saturation data is not higher than the threshold value Ks for example, the saturation is judged as abnormal, and saturation correction processing is carried out. The saturation of the hue is corrected so that the saturation data S becomes 60% of the maximum saturation of the hue for example.

Furthermore, in the case when image data has much noise (the noise is not limited to signal noise, but includes improper image data caused owing to loss or deterioration of image data and required to be excluded from desired image data), a judgment as to whether correction for eliminating the noise is required or not may be included.

In addition, although photographed images are taken as examples in the explanation of the above-mentioned embodiment, the present invention can be applied to any images, such as images created by computer graphics, images captured by scanners and the like.

Figure 11:
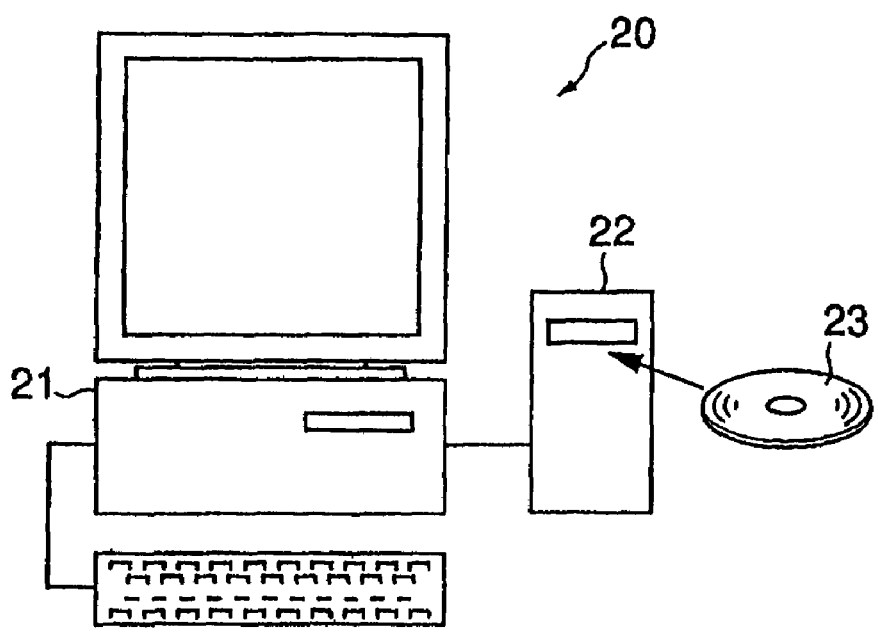
FIG. 11 is a view showing an image processing apparatus configured by using a computer system.
Figure 12:
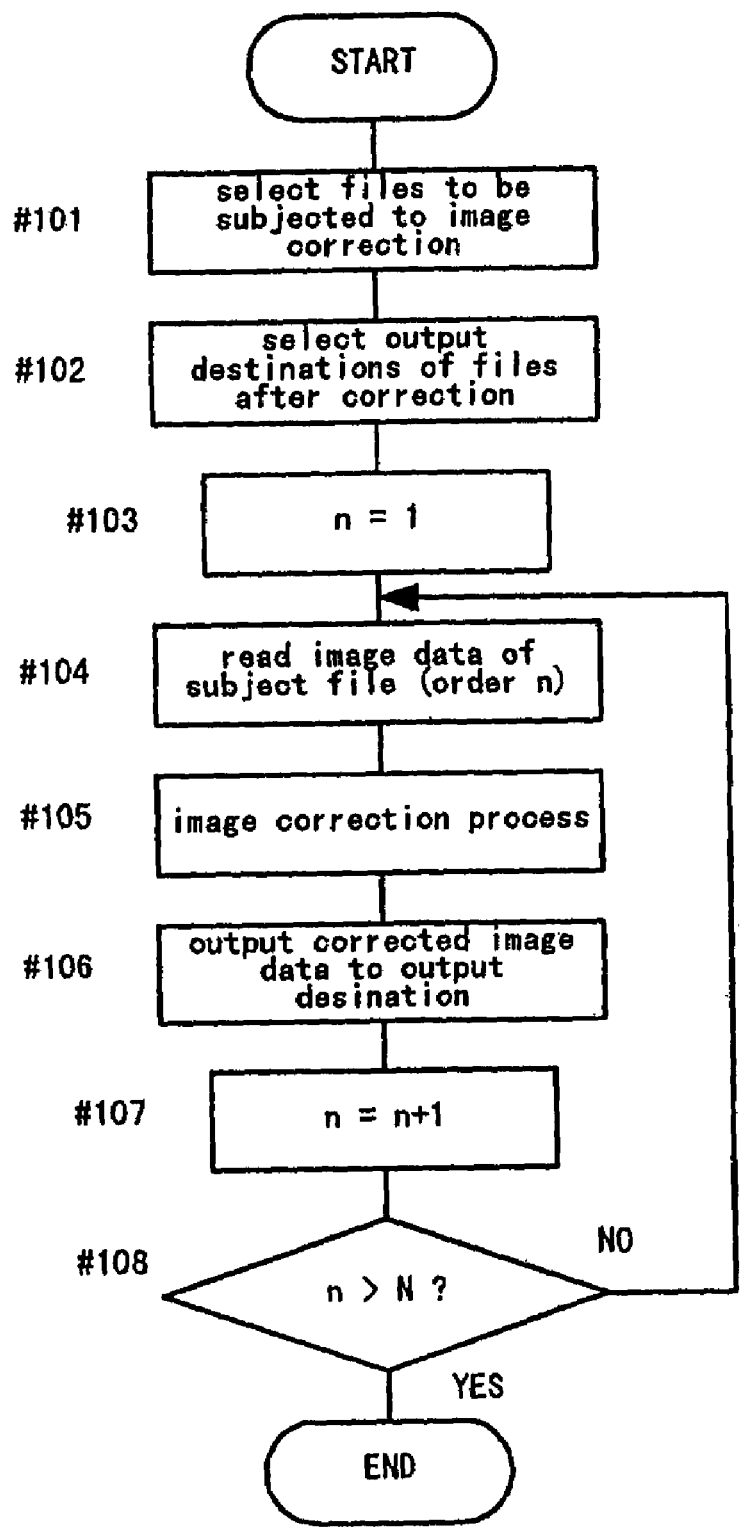
FIG. 12 is a flowchart showing a conventional processing procedure for correcting plural color images all together.

Furthermore, although the image processing apparatus provided with the processing program for the image processing method in accordance with the present invention is described in the above-mentioned embodiment, it is possible to configure an image processing apparatus 20 as shown in FIG. 11 by using a computer system wherein the processing program for the image processing method is stored on an external recording medium 23, i.e., a magnetic storage medium, such as a floppy disk or a magnetic tape, or an optical storage medium, such as a CD-ROM, an optical disk, an optical card or a magneto-optic disk, and read to a computer body 21 via an external storage device 22.

As described above, in accordance with the present invention, when the image quality of a color image is corrected, the necessity/nonnecessity of correction is judged, and the predetermined image processing is carried out only when the correction is necessary. Therefore, the necessity/nonnecessity of image correction is not required to be judged by the operator, whereby the processing efficiency of image correction is improved by that amount. In addition, in the case when correction is carried out for plural color images all together, the present invention is free from a problem of causing image deterioration due to unnecessary image correction which may otherwise be carried out for color images not required to be corrected.

Furthermore, since at least one of the sunset judgment, the color covering judgment, the contrast judgment and the sharpness judgment is included as a correction judgment item, the necessity/nonnecessity judgment for proper image correction can be carried out for photographed color images.

Moreover, when the image quality of a color image is corrected, the necessity/nonnecessity of correction is judged, and only when the correction is necessary, the processing program for carrying out the predetermined image processing is recorded on a readable recording medium. By applying this readable recording medium to a computer system, an image processing apparatus can be configured simply.

What is claimed is:

1. A judging method of contrast of an image data, comprising:
    calculating histograms of R, G and B data;
    calculating, for each histogram, a proportion of a prescribed range of the histogram to the whole range of the histogram, the prescribed range being a range in which a frequency at a level of the histogram is below a prescribed value; and
    judging a contrast of the image data based on the calculated proportion wherein the judging method is executed by a computer or a processor.

2. An image processing apparatus, comprising:
    a processor for calculating histograms of R, G and B data;
    a processor for calculating, for each histogram, a proportion of a prescribed range of the histogram to the whole range of the histogram, the prescribed range being a range in which a frequency at a level of the histogram is below a prescribed value; and
    a processor for judging a contrast of the image data based on the calculated proportion.

3. A computer readable medium with a recorded computer program, the computer program being executed and performing:
    calculating histograms of R, G and B data;
    calculating, for each histogram, a proportion of a prescribed range of the histogram to the whole range of the histogram, the prescribed range being a range in which a frequency at a level of the histogram is below a prescribed value; and
    judging a contrast of the image data based on the calculated proportion.

* * * * *